United States Patent [19]

Imazeki

[11] 4,196,691

[45] Apr. 8, 1980

[54] MANUALLY ROTATABLE CONTROL OR SELECTOR KNOB MEMBER

[75] Inventor: Kazuyoshi Imazeki, Tokyo, Japan

[73] Assignee: General Research of Electronics, Inc., Tokyo, Japan

[21] Appl. No.: 923,374

[22] Filed: Jul. 10, 1978

Related U.S. Application Data

[63] Continuation-in-part of Ser. No. 696,571, Jun. 16, 1976, abandoned.

[30] Foreign Application Priority Data

Mar. 2, 1976 [JP] Japan .................................. 51-22413
Mar. 2, 1976 [JP] Japan .............................. 51-24702[U]

[51] Int. Cl.² ........................... F16D 3/50; G05G 7/14
[52] U.S. Cl. ....................................... 116/309; 74/548; 403/289
[58] Field of Search ...................... 116/133, 309, 312; 403/354, 359, 289, 282, 243; 74/548

[56] References Cited

U.S. PATENT DOCUMENTS

| | | | |
|---|---|---|---|
| 2,098,581 | 11/1937 | Jones | 403/289 |
| 2,156,067 | 4/1939 | Rubinstein | 403/354 X |
| 3,000,656 | 9/1961 | Hollander | 403/298 |
| 3,619,594 | 11/1971 | Morez | 116/309 |
| 3,853,090 | 12/1974 | Watson et al. | 116/312 |
| 3,902,152 | 8/1975 | Van Benthuysen | 74/548 X |
| 3,932,048 | 1/1976 | DuPont | 403/298 X |
| 3,973,206 | 8/1976 | Haselwood et al. | 325/455 |
| 3,990,013 | 11/1976 | Badger | 74/548 X |
| 4,015,253 | 3/1977 | Goldstein | 325/455 X |
| 4,041,401 | 8/1977 | Kitamura et al. | 325/455 |
| 4,121,160 | 10/1978 | Cataldo | 325/16 X |

Primary Examiner—Daniel M. Yasich
Attorney, Agent, or Firm—Wallenstein, Spangenberg, Hattis & Strampel

[57] ABSTRACT

Manually rotatable control or selector knob member adapted to be connected to an operating shaft for an electrical or electronic device, such as a rotary switch, a volume control, etc., said operating shaft having a forward end portion fluted in the longitudinal direction thereof, which has a locking hole formed centrally therein and an annular lining of resilient material provided inside the wall of the locking hole. With this construction, the knob member can be fastly coupled to the operating shaft, while being locked in place at any desired angular position with respect to the forward end portion of the shaft.

2 Claims, 8 Drawing Figures

MANUALLY ROTATABLE CONTROL OR SELECTOR KNOB MEMBER

This is a continuation-in-part of application Ser. No. 696,571, filed June 16, 1976, now abandoned.

BACKGROUND OF THE INVENTION

This invention relates to a manually rotatable control or selector knob for electrical or electronic device such as a rotary switch, a volume control, etc. More particularly, this invention relates to a control or selector knob of the type which is capable of being locked in place at any desired angular position with respect to the forward end of a shaft extending from such electrical or electronic device thereby to be locked in a desired position with respect to the electrical or electronic device.

Such electrical or electronic devices are used for example in a radio receiver, a transceiver, etc. and have an operating shaft which cooperates with a knob member affixable thereto to form a rotatable assembly for volume controlling, or switch or selection operation of the electrical or electronic device. The operating shaft has forward end portion extending outside a housing or a panel of the electrical or electronic device and adapted to be received in a hole formed centrally in the knob member. The affixture of the knob member to the forward end portion of the operating shaft is conventionally attained by a screw inserted in the radial direction of the opening to abut the screw against the periphery of said forward end portion of the shaft. It is also conventional to provide, on the forward end portion of the shaft, a plurality of grooves or flutes extending along the length thereof and to form, on the inner periphery of the hole wall, a plurality of match or mating protuberances to be brought into mesh with said grooves when assembled for their interlocking. The latter method is more convenient than the former method because the former can achieve the affixture easily and quickly without using any special tool therefor and more advantageous because the knob member may be formed in any desired shape free from restriction due to the affixture with the screw. The method, however, has a fatal defect when used in such a case that the knob member should be mounted on the shaft accurately in place, keeping a predetermined relation to the electrical or electronic device to which the shaft is connected. Due to the fact that the interlocking or affixture between the knob member and the shaft is attained through the engagement of the grooves of the shaft and the mating protuberances of the opening of the knob, it is often difficult to lock the knob member in an accurate position or achieve fine adjustment with respect to the operational position of the electrical or electronic device. This defect is inherent in such locking through engagement between grooves and protuberances and cannot be eliminated completely even when the pitch of the grooves is reduced as small as possible. Stated illustratively, when an indicator knob having a pointer is required to be affixed to the shaft preliminarily connected, for example, to a rotary switch and mounted through a panel of the rotary switch, and the panel has on its front face indicia corresponding to the contact positions of the rotary switch, it is essential to dispose the pointer at an accurate relative position to the forward end portion of the shaft for accurate corresponding location with respect to the indicia of the panel and the contact positions of the rotary switch. If the pointer is not located in a proper position with reference to the contact positions of the rotary switch or the pointer is not accurately located on the corresponding indicia, not only the knob member but also the rotary switch should be unmounted from the panel for resetting. Such an inaccurate location of the knob member onto the shaft also provides a serious problem when the knob member has a board portion of increased diameter, for example for channel selector, and indicia are provided at its radial peripheral portion, because any disagreement from the desired position would be much amplified at the peripheral portion, causing more serious divergence from an indicator on a front panel as the diameter of the board portion increases. This defect would offset such advantage of the locking through groove-and-protuberance engagement as referred to above. In effect, it is not practical to employ this method in case where a knob member is mounted for a multicontact rotary switch and a plurality of indicia are provided closely with each other on an indication panel or a board portion of the knob member.

It is therefore an object of the present invention to provide a manually rotatable control or selector knob which is capable of being locked, by a simple operation, in place at any desired angular position with respect to the forward end of the operating shaft and therefore locked at any desired angular position with respect to the operational position of the electrical or electronic device.

SUMMARY OF THE INVENTION

In accordance with the present invention, there is provided in manually rotatable control or selector knob means adapted to be used with an operating shaft of rotary control or selector means, said rotatable control knob having a locking hole for receiving the forward end portion of said operating shaft, and said forward end portion of the operating shaft being fluted longitudinally: the improvement comprising a lining of a resilient material provided on the inner periphery of the wall of the hole and adapted to frictionally and/or resiliently receive thereon said forward end portion of the operating shaft, to provide a frictional and resilient locking engagement between the forward end portion of the operating shaft and the interior of the manually rotatable control knob means, allowing said knob to be locked in place at any angular position with respect to said end portion of the shaft.

PREFERRED EMBODIMENTS OF THE INVENTION

Figure 1:
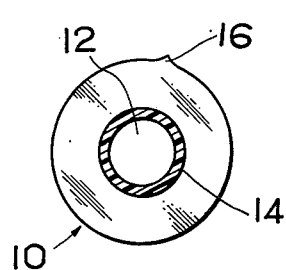
FIG. 1 is a rear elevational view of a manually rotatable control or selector knob member in accordance with the present invention.
Figure 2:
FIG. 2 is a fragmentary side view of one form of an operating shaft employable in the present invention.
Figure 3:
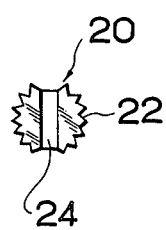
FIG. 3 is a forward end view of another form of an operating shaft also employable in the present invention.

Referring now to FIG. 1, there is illustrated one embodiment of the present invention. A knob member 10 has a locking hole 12 formed centrally therein for receiving therein an operating shaft 20 of an electrical or electronic device such as a rotary switch or the like, as shown in FIG. 2 or 3. The knob member 10 has a pointer 16 for indication of the operational position of the rotary switch etc. in cooperation with indicia on a panel or housing (not shown). The shaft 20 has a plurality of grooves on the periphery thereof at its forward end portion 22. The grooves extend in the longitudinal direction of the shaft 20. The shaft 20 may be a conventional one which has at its forward end portion a plurality of grooves or flutes extending in the longitudinal direction and is designed to be used with a conventional knob member having protuberances matable with said grooves. The locking hole 12 generally has a diameter slightly larger than the outer diameter of the forward end portion 22 of the operating shaft 20, and provided on its wall with an annular resilient member 14. This annular resilient member 14 has a thickness which is so determined that the inner diameter of the member is slightly smaller than the outer diameter of the forward end portion 22 of the shaft 20 thereby to provide a close fit between the forward end portion 22 of the shaft and the annular member 14. It is preferable that the thickness of the resilient member 14 is not so large. In case the thickness is too large, the holding of the knob member is liable to be loosened or the resilient member is liable to be twisted. The resilient member 14 may be made from any material which has resiliency, flexibility or elasticity, for example, rubber, synthetic plastic material, etc. The member 14 may be a tubular member of resilient material fitted to the wall of the opening 12 by an adhesive. Alternatively, the member 14 may be formed by molding concurrently with the formation of the knob member 10.

In case the operating shaft 20 having a slit 24 at its forward end portion 22 is employed, the diameter of the wall of the opening 12 may be substantially the same as the outer diameter of said forward end portion 22 of the shaft 20 so that the annular member 14 provided on the wall of the hole 12 may be more positively and fastly engaged after the forward end 22 of the shaft 20 is forced into the hole 12 owing to the resiliency of both of the annular member 14 and the slitted forward end portion 22 of the shaft 20.

Figure 4:
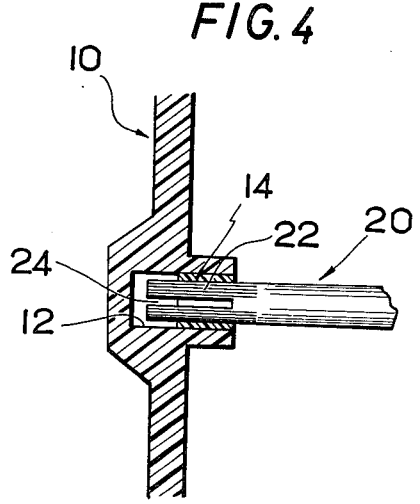
FIG. 4 is a fragmentary cross sectional view of the manually rotatable control or selector knob member shown in FIG. 1 assembled with the shaft of FIG. 2 or FIG. 3.

FIG. 4 shows the knob member 10 assembled with the forward end portion 22 of the shaft 20. As shown in the figure, the forward end 22 of the shaft 20 is fastly held by the resilient member 14 provided in the locking hole 12. However, please note that the knob member 10 may be locked in any desired angular position with respect to the forward end portion 22 of the shaft 20 since the annular member 14 has a smooth inner surface without grooves or protuberances thereon.

Figure 5:
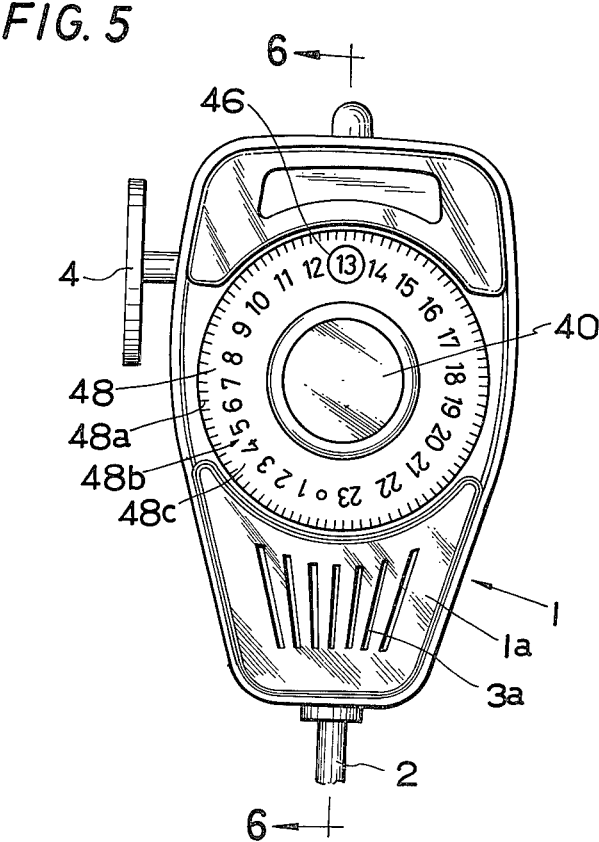
FIG. 5 shows one application of the present invention to a transceiver.

FIG. 5 is a front elevational view of a radio transceiver incorporating therein a knob member 40 in accordance with the present invention. A combination microphone, speaker, and control unit 1 is adapted to be coupled to the receiver and transmitter circuitry on the transceiver chassis by means of a partiallyshown multiconductor cord or electrical cable 2. Unit 1 is generally contained within a housing 1a. The particular radio circuitry of the transceiver forms no portion of the present invention and may be of any conventional construction.

Figure 6:
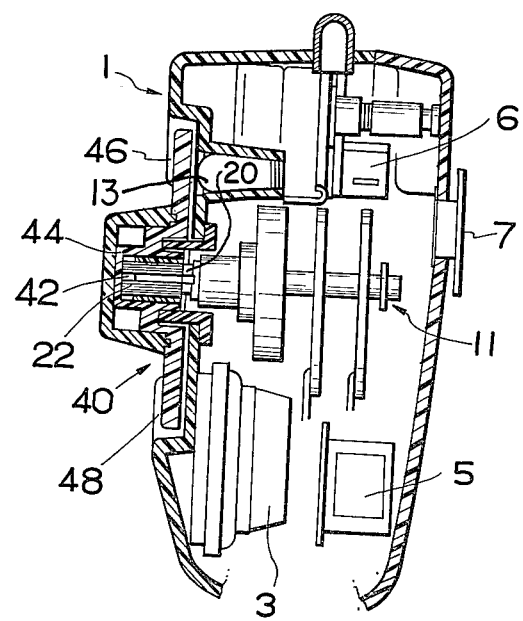
FIG. 6 is a cross sectional view taken substantially along line 6—6 of FIG. 5.

Behind a grille 3a is mounted an electromechanical transducer in the form of a combination speaker and microphone 3 (see FIG. 6) which is mounted in housing 1a and connected to the transceiver circuitry by means of cable 2. Microphone/speaker 3 is operable to convert audible sound wave signals into corresponding audio frequency signals and audio frequency electrical signals into corresponding audible sound wave signals. A transmit/receive control 4 is provided to enable the operator to use microphone/speaker 3 both as a microphone, to convert audible sound wave signals into corresponding audio frequency electrical signals, and a speaker, to convert audio frequency electrical signals into audible sound wave signals, as desired. An impedance-matching transformer 5 is connected to microphone/speaker 3 and is employed to facilitate the dual functions of microphone/speaker 3. Control 4 is mechanically connected to an electrical transmit/receive switch 6 (see FIG. 6) which may be of the spring-loaded push-button or momentary contact type so that, when control 4 is released, switch 6 is urged to the normal or "receive" position and microphone/speaker 3 performs as a speaker to audibly reproduce the message being received by the transceiver. A hanger 7 is provided at the rear of unit 1 as shown to provide means for supporting the unit when it is not in use.

When control 4 is depressed (i.e., moved to the right in FIG. 5), switch 6 is placed in the "transmit" position and microphone/speaker 3 performs as a microphone to convert the operator's audio message into an electrical signal for transmission by the transceiver to another radio receiver (not shown). Under a lamp cover at the top of unit 1, an indicator lamp is provided and connected to switch 6 so that lamp is illuminated whenever control 4 is in the depressed or "transmit" position. Lamp may also be connected to the transmitter circuitry such that, during transmission, its brightness varies systematically in accordance with the level of modulation.

Figure 7:
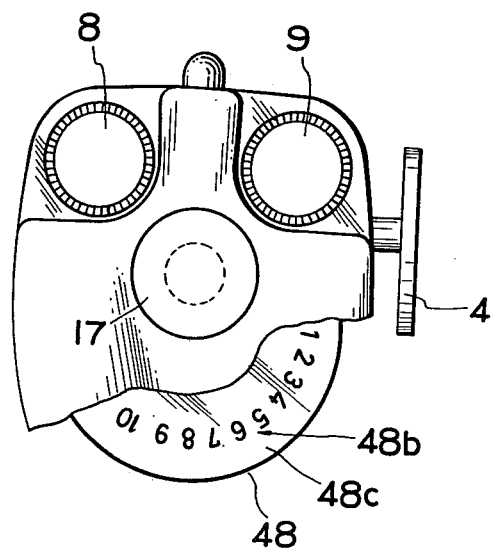
FIG. 7 is a rear elevational view, partially cut away, of the transceiver shown in FIG. 5.

As better shown in FIG. 7, a combination on/off switch and volume control 8 and a squelch control 9 are provided at the rear of unit housing 1a near its top for convenient operation by the operator's thumb and forefinger, respectively. The outer edges of controls 8 and 9 are preferably knurled as shown to facilitate manipulation thereof. Control 8 is coupled to cable 2 and microphone/speaker 3 for varying the amplitude of the audio frequency electrical signals applied to a microphone/speaker 3 to control the volume of audible sound wave signals emitted thereby. Squelch control 9 is mounted on housing 1a and is coupled to cable 2 to provide a convenient way of adjusting the signal level at which the transceiver reproduces audible sound wave signals. Squelch control 9 has a variable electrical characteristic such as resistance which may be used for this purpose by the transceiver circuitry as is well known in the radio art.

Returning to FIG. 6, a rotary dial or channel selector knob 40 is attached to a multi-position switch 11 to permit individual selection of the preselected frequencies through resilient or frictional engagement between the end portion 22 of the shaft 20 and an annular resilient member 44 fitted around the locking hole 42 of the knob 40. A channel indicator board portion or plate 48 carries light transmissive indicia 48b respectively associated with the preselected frequencies, with indicia 48b being surrounded by a portion 48c of dial plate 48 which is made substantially the same color as housing 1a so that indicia 48b are substantially invisible except when illuminated. Said indicator board portion may of course be formed integrally with the knob 40 instead of being formed separately as shown. The peripheral portion of plate 48 is knurled at 48a and extends substantially to the outer edge of housing 1a to facilitate one-hand operation. In the illustrated embodiment of the invention, indicia for 23 channels are shown because many present-day transceivers are designed to operate on the 23 channels presently assigned by the Federal Communications Commission for Citizens' Band use, the frequencies thereof ranging from 26.96 Mhz to 27.26 Mhz; however, any desired number of channels may be used.

Channel indication is achieved by providing lamp means in the form of a light-emitting diode (LED) 13 mounted on housing 1a adjacent to the indicia-carrying portion of dial plate 48 and coupled to cable 2. When the transceiver is operative, by being turned on by control 8, for example, LED 13 is energized to illuminate one of the indicia on dial plate 48 adjacent to LED 13, as generally indicated at 46.

As heretofore referred to, the knob 40 can be locked in any desired angular position with respect to the forward end portion 22 of the shaft 20, so that one of the indicia 48 to be illuminated may be brought into proper position with respect to LED 13. If the indicia is not positioned properly with reference to LED 13, the indication of said one of the indicia to be illuminated would not fully effected or misindication would possible be caused.

Figure 8:
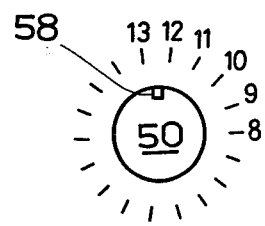
FIG. 8 is a somewhat schematic view of another embodiment of the present invention in which a knob member with a pointer is employed in combination with a panel having indicia thereon.

In FIG. 8, there is illustrated another embodiment of a manually rotatable control or selector knob 50 having a pointer 58 which is also capable of being accurately located at a desired position with respect to indicia on a panel of a radio receiver etc.

What is claimed is:

1. A rotatable control assembly comprising: an operating shaft, a manually rotatable control member having a locking hole of a preselected larger diameter than the diameter of said shaft, said locking hole adapted to receive an outer end portion of said operating shaft, the outer end portion of said operating shaft being longitudinally slotted so that the portions thereof on opposite sides of the slot are inwardly flexible to be resiliently frictionally fittable into said locking hole, the surfaces of at least one of said flexible portions of said operating shaft on opposite sides of said slot therein being fluted longitudinally, and said locking hole of said manually rotatable control member being lined with a flexible elastic material into which said inwardly flexible fluted portions of said operating shaft are closely frictionally fitted, to provide a friction locking engagement between the outer end portion of said operating shaft and said manually rotatble control member, whereby said control member is selectively locked onto said operating shaft at a desired angular position.

2. The rotatable control assembly of claim 1 wherein said flexible elastic material is a synthetic plastic material.

* * * * *